(12) United States Patent
Foege et al.

(10) Patent No.: US 9,989,017 B2
(45) Date of Patent: Jun. 5, 2018

(54) SYSTEM AND METHOD FOR OPERATING A CRYOGENIC FUEL SYSTEM

(71) Applicant: Electro-Motive Diesel, Inc., LaGrange, IL (US)

(72) Inventors: Aaron Gamache Foege, Westmont, IL (US); Kathryn Corine Svoboda, Brookfield, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days. days.

(21) Appl. No.: 15/201,886

(22) Filed: Jul. 5, 2016

(65) Prior Publication Data

US 2018/0010554 A1 Jan. 11, 2018

(51) Int. Cl.
*F02M 21/02* (2006.01)
*F02B 37/12* (2006.01)
*F02M 21/06* (2006.01)

(52) U.S. Cl.
CPC .......... *F02M 21/0245* (2013.01); *F02B 37/12* (2013.01); *F02M 21/0209* (2013.01); *F02M 21/0218* (2013.01); *F02M 21/06* (2013.01)

(58) Field of Classification Search
CPC ............... F02M 21/06; F02M 21/0278; F02M 21/0245; F02M 21/0218; F02M 21/0221; F02M 21/0224; F02M 21/023; F02M 21/0239; F02M 21/08; F02M 21/10; F02D 19/0605; F02D 19/0623; F02D 19/0647; F02D 19/0694; F02D 19/0673; F02D 19/0678; F02D 19/0684; F02D 41/0025; F02D 41/0027; F02D 41/10; F02B 37/12

See application file for complete search history.

(56) References Cited

U.S. PATENT DOCUMENTS

| 6,663,350 | B2 | 12/2003 | Tyree, Jr. | |
| 8,245,695 | B2 * | 8/2012 | Martin | F02D 19/0647 123/446 |
| 8,522,691 | B1 | 9/2013 | Foege | |
| 9,027,534 | B2 | 5/2015 | Kim et al. | |
| 9,234,472 | B2 | 1/2016 | Kim et al. | |
| 2008/0302111 | A1 * | 12/2008 | Batenburg | F04B 9/105 62/50.6 |
| 2014/0123916 | A1 * | 5/2014 | Coldren | F02B 43/10 123/3 |

(Continued)

FOREIGN PATENT DOCUMENTS

| CA | 2866992 | 12/2014 |
| CA | 2882584 | 4/2015 |

*Primary Examiner* — Lindsay Low
*Assistant Examiner* — George Jin

(57) ABSTRACT

A method of operating a cryogenic fuel system for supplying fuel to an engine is provided herein. A cryogenic fuel pump is operated to pump fuel to be supplied to the engine. At least a portion of the pumped fuel is diverted to be supplied to an accumulator, when a fuel demand of the engine is less than a discharge output of the cryogenic fuel pump. Further, the supply of the pumped fuel from the cryogenic fuel pump to the engine and the accumulator is stopped, when a pressure within the accumulator reaches a first predefined pressure limit. Furthermore, the fuel is supplied to the engine from the accumulator, when supply of the pumped fuel from the cryogenic fuel pump to the engine and the accumulator is stopped.

18 Claims, 3 Drawing Sheets

(56) References Cited

U.S. PATENT DOCUMENTS

2014/0238351 A1* 8/2014 Haas ................... F02D 19/0605
 123/446
2014/0299101 A1 10/2014 Melanson et al.
2015/0219044 A1 8/2015 Melanson et al.
2015/0226140 A1* 8/2015 Zhang ................. F02D 41/0027
 123/497

* cited by examiner

SYSTEM AND METHOD FOR OPERATING A CRYOGENIC FUEL SYSTEM

TECHNICAL FIELD

The present disclosure relates to a cryogenic fuel system for an internal combustion engine. More particularly, the present disclosure relates to a system and a method for operating the cryogenic fuel system.

BACKGROUND

Limited availability and hence the volatile costs of petroleum based liquid fuels, such as gasoline, diesel fuel, jet fuel, etc., have increased usage of alternative fuel options, such as liquefied fuel gases. Examples of such liquefied fuel gases include Liquefied Natural Gas (LNG), Liquefied Hydrogen (LH), Refrigerated Liquefied Methane (RLM), etc. Such liquefied fuel gases are typically liquefied at very low (cryogenic) temperatures, such as −130° C. to −170° C.

Generally, liquefied fuel gases are stored in cryogenic fuel tanks, which are maintained at a low temperature as required by the fuel gas to remain in liquid form. Natural Gas (NG) is one of the most popular alternative fuel option that is used by internal combustion engines as Liquefied Natural Gas (LNG) or Compressed Natural Gas (CNG). In general, a liquefied gas is converted into gaseous form before being supplied to the engine for combustion.

Cryogenic fuel systems for delivering gaseous fuel to the engine typically include a high pressure cryogenic fuel pump used to supply fuel from the cryogenic fuel tank to a vaporizer. The vaporizer converts the fuel from liquefied form into gaseous form, which is subsequently supplied to the engine for combustion. Typically, high pressure cryogenic fuel pumps have their respective rated maximum and minimum speed, at which these pumps may operate. Operational speed of the high pressure cryogenic fuel pump may be adjusted based on a fuel demand of the engine and according to the mechanical limitations of the high pressure cryogenic fuel pump. However, many times, such as for low load and idle operating conditions, engine fuel demand is much less than what the cryogenic fuel pumps can deliver at their minimum rated speed (also referred to as the minimum discharge output of the pump). Therefore, the cryogenic fuel pumps may not be sufficiently capable of fueling the engine, say, below their minimum rated speed and capability, in order to meet the low engine fuel demands at low load and idle operating conditions. Thus, in one of such scenarios, the cryogenic fuel pumps are completely switched off to stop pumping any fuel to the engine, which may stop the engine as well. In another such scenario, the cryogenic fuel pumps could be run on the minimum rated speed to discharge their minimum output of fuel, which exceeds the flow to be supplied to the engine. The excess fuel can be separated out and returned to the storage tank. This results in wastage and excessive warming of fuel which is beyond what is required by the engine. In both the scenarios, running the engine in low load and/or idling conditions becomes a challenge.

U.S. Pat. No. 6,663,350 ('350) describes a high pressure pump suitable for Liquefied Natural Gas and other cryogenic liquid fuel powered vehicles. The high pressure pump is a reciprocating pump which includes a liquid pumping portion and a vapor compressing portion, operating in concert so that it is possible to locate the pump above a source of saturated LNG and to supply high pressure LNG to the engine. However, the '350 patent does not take into account the low engine fuel demands and/or idle conditions of the engine. Thus, there is a need for a better way to operate the cryogenic fuel systems in order to handle low and/or idle operating conditions of the engine.

SUMMARY

According to an aspect of the present disclosure, a method of operating a cryogenic fuel system for supplying fuel to an engine is provided herein. The method includes operating a cryogenic fuel pump, in order to pump fuel to be supplied to the engine. The method further includes diverting at least a portion of the pumped fuel to an accumulator, when a fuel demand of the engine is less than a discharge output of the cryogenic fuel pump. Further, the method includes stopping the supply of the pumped fuel from the cryogenic fuel pump to the engine and the accumulator, when a pressure within the accumulator reaches a first predefined pressure limit. Furthermore, the method includes supplying fuel to the engine from the accumulator, when supply of the pumped fuel from the cryogenic fuel pump to the engine and the accumulator is stopped.

According to another aspect of the present disclosure, a control system for operating a cryogenic fuel system for supplying fuel to an engine is provided herein. The control system includes a controller operatively coupled to the engine, a cryogenic fuel pump, and an accumulator of the cryogenic fuel system. The controller is configured to operate the cryogenic fuel pump in order to pump fuel to be supplied to the engine. The controller is further configured to divert at least a portion of the pumped fuel to the accumulator, when the fuel demand of the engine is less than a discharge output of the cryogenic fuel pump. Further, the controller is configured to stop the supply of the pumped fuel from the cryogenic fuel pump to the engine and the accumulator, when a pressure within the accumulator reaches a first predefined pressure limit. Furthermore, the controller is configured to facilitate fuel supply from the accumulator to the engine, when supply of the pumped fuel from the cryogenic fuel pump to the engine and the accumulator is stopped.

According to yet another aspect of the present disclosure, a cryogenic fuel system for supplying fuel to an engine is provided herein. The cryogenic fuel system includes a cryogenic fuel tank, a cryogenic fuel pump, an accumulator and a controller operatively coupled to the engine, the cryogenic fuel pump, and the accumulator. The cryogenic fuel tank is configured to store the cryogenic fuel. The cryogenic fuel pump is configured to pump fuel from the cryogenic fuel tank to be supplied to the engine. The accumulator is configured to divert at least a portion of the pumped fuel to be supplied to the accumulator, when a fuel demand of the engine is less than a discharge output of the cryogenic fuel pump. The controller is further configured to stop supply of the pumped fuel from the cryogenic fuel pump to the engine and the accumulator, when a pressure within the accumulator reaches a first predefined pressure limit. Furthermore, the controller is configured to facilitate fuel supply from the accumulator to the engine, when supply of the pumped fuel from the cryogenic fuel pump to the engine and the accumulator is stopped.

DETAILED DESCRIPTION

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the art that this disclosure can also be employed in a variety of other applications. Thus, the detailed description herein is presented for purposes of illustration only and not of limitation. For example, the steps recited in any of the method or process descriptions may be executed in any order and are not limited to the specific order presented.

It may be further noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

Figure 1:
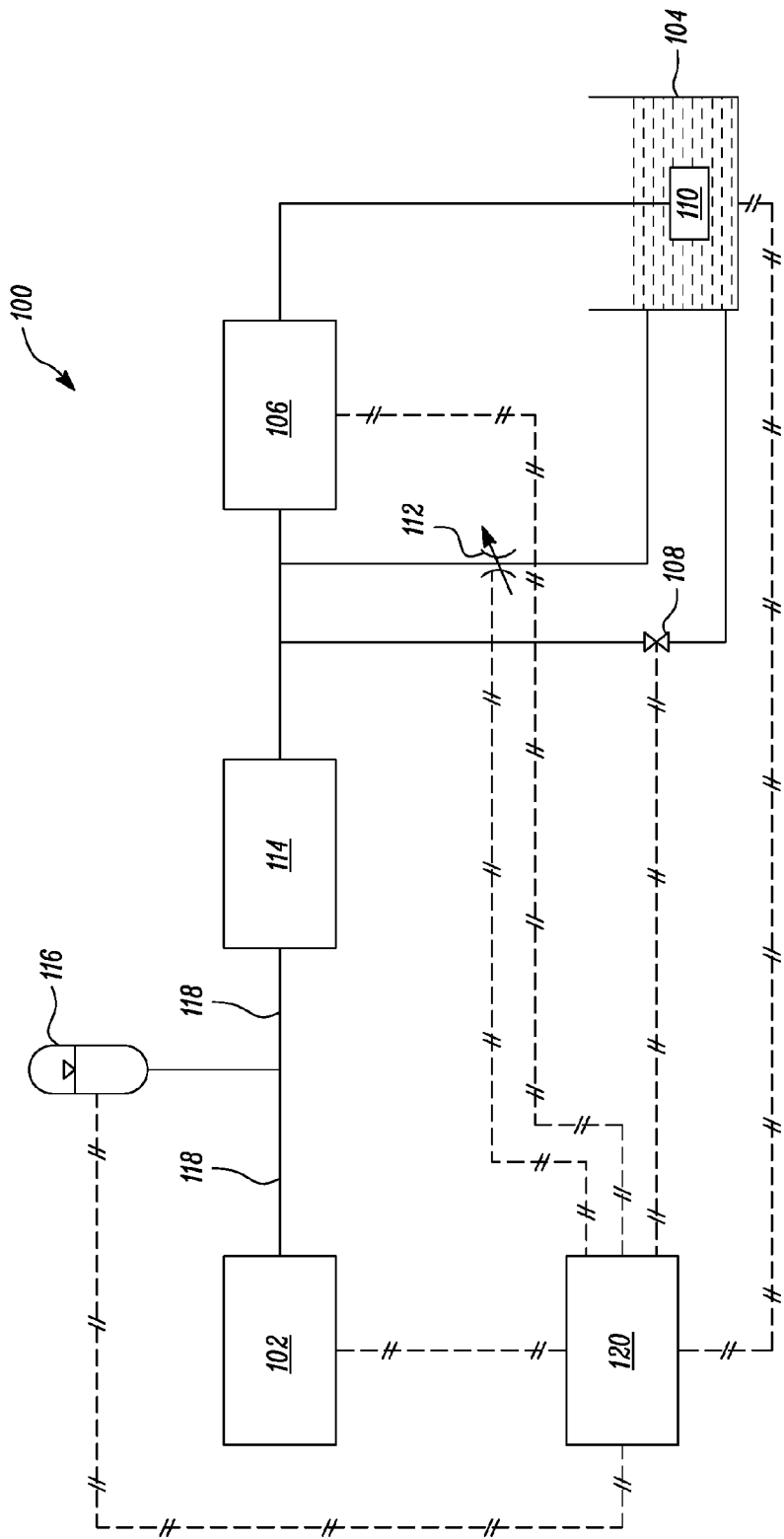
FIG. 1 illustrates a schematic representation of a cryogenic fuel system, in accordance with various embodiments of the present disclosure.

FIG. 1 illustrates a schematic representation of an exemplary fuel system 100 for supplying fuel to an engine 102, according to the various embodiments of the present disclosure. The fuel system 100 is embodied as a cryogenic fuel system for supplying a gaseous fuel, which is stored as a cryogenic fuel, to the engine 102. In an embodiment, the gaseous fuel supplied to the engine 102 is Natural Gas (NG) which is stored in liquefied form as Liquefied Natural Gas (LNG). Other examples of fuel may include, but not limited to, Liquefied Hydrogen (LH), and Refrigerated Liquefied Methane (RLM).

The engine 102 may be based on one of the commonly applied power-generation units, such as an internal combustion engine (ICE), a fuel cell, etc. The engine 102 may include a V-type engine, in-line engine, or an engine with different configurations, as is conventionally known. Although not limited to one of the configurations, the engine 102 may be a spark-ignition engine or a compression ignition engine, which may be applied in power generation equipment, on-highway trucks, construction machines, mining trucks, and locomotives. However, aspects of the present disclosure, need not be limited to a particular engine type. In an embodiment, the engine 102 includes a compression chamber, a piston movable in the combustion chamber, an air inlet port and an exhaust gases outlet port. In operation, the compression chamber receives a fuel which is ignited to execute a power stroke to generate desired power output. For the sake of brevity, operation of the conventional engines and other functional aspects of the conventionally known engines may not be described in greater detail herein.

As illustrated in FIG. 1, the fuel system 100 includes a cryogenic fuel tank 104, hereinafter referred to as the tank 104, for storing the liquefied fuel at very low (cryogenic) temperatures. For example, the tank 104 stores the liquefied fuel at a cryogenic temperature as low as −160° C. to keep the NG in a liquefied state. It will be appreciated that the temperature for storing the liquefied fuel as described herein is merely exemplary and that other storage temperatures are also possible without deviating from the scope of the disclosed subject matter.

The fuel system 100 further includes a cryogenic fuel pump 106, hereinafter referred to as the primary pump 106. The primary pump 106 is configured to pump liquefied fuel from the tank 104 to be supplied to the engine 102. It will be appreciated that the fuel stored in the tank 104 is in liquefied state, however, the fuel supplied to the engine 102 for combustion is in gaseous state. In an embodiment of the present disclosure, the primary pump 106 is a high pressure reciprocating piston type pump, driven by a motor (not shown in FIG. 1). Conventionally known motors such as electrically or hydraulically operated motor can be used herein to drive the primary pump 106.

Operational speed of the primary pump 106 is controlled based on a fuel demand of the engine 102. The fuel demand of the engine 102 (hereinafter interchangeably referred to as the engine fuel demand) may be understood as an amount of fuel required by the engine 102 to produce a desired amount of power. The primary pump 106 is operated within a range of predefined maximum and minimum operational speeds in order to adjust the discharge output of the primary pump 106 based on the engine fuel demand.

The fuel system 100 further includes an unloader valve 108 connected to the outlet of the primary pump 106. The unloader valve 108 is configured to selectively direct the pumped fuel from the primary pump 106 back into the tank 104. In an embodiment, the unloader valve 108 may be a solenoid or pneumatically operated valve configured to open and close to fluidly connect and/or disconnect the outlet of the primary pump 106 with the tank 104.

In an embodiment, the fuel system 100 further includes a boost pump 110, hereinafter referred to as the secondary pump 110, configured to boost or increase the flow of the liquefied fuel from the tank 104 to the primary pump 106. As illustrated in FIG. 1, the secondary pump 110 is submerged within the tank 104. In alternative embodiments, the secondary pump 110 may be positioned outside the tank 104. The secondary pump 110 pumps the liquefied fuel from the tank 104, such that the liquefied fuel can reach the inlet of the primary pump 106 at its desired suction pressure in order to be efficiently pumped further by the primary pump 106.

The secondary pump 110 is further configured to continuously circulate the cryogenic liquefied fuel from the tank 104 through the primary pump 106, for cooling the primary pump 106 such as before, or during, or after the operation. Similar to the primary pump 106, the secondary pump 110 also has a rated maximum and minimum operational speed. The operational speed of the secondary pump 110 is adjusted in order to supply liquefied fuel at the desired suction pressure of the primary pump 106 and the amount of liquefied fuel required to be circulated through the primary pump 106 based on the operational conditions of the primary pump 106 and the engine fuel demand. In an exemplary embodiment, a feedback mechanism may be employed at the secondary pump 110, where the suction pressure at the primary pump 106, which is equivalent to an output pressure at the secondary pump 110, is monitored to adjust the operational speed of the secondary pump 110.

A back pressure valve 112 is positioned at the outlet of the primary pump 106. In an embodiment, the back pressure valve 112 is a variable orifice configured to regulate the flow of liquefied fuel through the primary pump 106. Furthermore, the liquefied fuel pumped by the secondary pump 110 is circulated through the primary pump 106 and returned back to the tank 104 through the back pressure valve 112. For example, when the primary pump 106 runs at a higher speed, a greater amount of liquefied fuel is required to be circulated through the primary pump 106 to cool it down. Similarly, when the primary pump 106 runs at a lower speed or is switched off, a lower amount of liquefied fuel is required to be circulated through the primary pump 106 to cool it down. In an exemplary embodiment, the amount of liquefied fuel required for cooling the primary pump 106 is 0.1 times the discharge output of the primary pump 106. Thus, the back pressure valve 112 may be adjusted accordingly to regulate the amount of fuel circulated through the primary pump 106.

A vaporizer 114 is fluidly connected to the primary pump 106, such that the vaporizer 114 receives the pumped high pressure liquefied fuel, such as LNG, from the tank 104. The high pressure liquefied fuel, pumped by the primary pump 106, is converted into high pressure gaseous fuel by the vaporizer 114. The high pressure gaseous fuel is then supplied to the engine 102 for combustion. Any conventionally known vaporizer may be used to convert the high pressure liquefied fuel into gaseous form and thus the operational aspects of the vaporizer are not discussed here in further details, for the sake of brevity.

According to an embodiment of the present disclosure, the fuel system 100 further includes an accumulator 116. The accumulator 116 is fluidly connected, through a conduit 118, to the primary pump 106 via the vaporizer 114. The accumulator 116 is also fluidly connected to the engine 102 through the conduit 118, as illustrated in FIG. 1. The accumulator 116 is configured to selectively receive and store the fuel in gaseous state received from the primary pump 106 via the vaporizer 114. Furthermore, the accumulator 116 is configured to selectively supply the stored gaseous fuel to the engine 102 when required, as explained in further details below. It may be contemplated that the accumulator 116 may be embodied within an accumulator system as an accumulator tank for storing the gaseous fuel, one or more valves for connecting and disconnecting the accumulator tank with the vaporizer 114 and the engine 102, and one or more sensors for sensing various parameters of the accumulator system.

The accumulator 116 is configured to selectively receive at least a portion of the high pressure fuel pumped by the primary pump 106 via the vaporizer 114. In an embodiment, when the engine fuel demand is less than the discharge output of the primary pump 106, then one portion of the pumped fuel is supplied to the engine 102 to meet the engine fuel demand and the excess fuel is diverted to the accumulator 116 for storage.

In an embodiment, a valve (not shown in FIG. 1) may be positioned in the conduit 118, and configured to open and close to facilitate regulated flow of gaseous fuel into the accumulator 116. In an alternative embodiment of the present disclosure, the accumulator 116 is always connected to the primary pump 106 such that it receives some portion of the fuel from the primary pump 106 via the vaporizer 114. For example, in order to regularize supply or fluctuations in the pumped output of fuel into the engine 102 during pressure fluctuations caused due to fluctuating engine operating conditions and fuel demand, some amount of pumped fuel is always diverted to the accumulator 116 for storage.

In an embodiment of the present disclosure, the fuel system 100 further includes a control system for operating the fuel system 100. The control system includes a controller 120 operatively coupled to the various components of the fuel system 100 (as shown by the broken lines in FIG. 1).

The controller 120 disclosed herein may include various software and/or hardware components that are configured to perform functions consistent with the present disclosure. As such, the controller 120 of the present disclosure may be a stand-alone controller or may be configured to co-operate in conjunction with an existing electronic control module (ECM) of a vehicle to perform functions consistent with the present disclosure. Further, the controller 120 may embody a single microprocessor or multiple microprocessors that include components for selectively controlling operations of the fuel system 100 based on a number of operational parameters associated with the fuel system 100.

Numerous commercially available microprocessors can be configured to perform the functions of the controller 120. It should be appreciated that the controller 120 could readily be embodied in a general machine microprocessor capable of controlling numerous machine functions as well. The controller 120 may also include a memory (not shown), a secondary storage device, a processor, and any other components for running an application. Various other circuits may be associated with the controller 120, such as power supply circuitry, signal conditioning circuitry, solenoid driver circuitry, and other types of circuitry. Additionally, various routines, algorithms, and/or programs can be programmed within the controller 120 for execution to control the operation of the fuel system 100.

As shown in FIG. 1, the controller 120 is operatively connected to the engine 102, the primary pump 106, the secondary pump 110, the backpressure valve 112, the accumulator 116, and the unloader valve 108. According to an embodiment of the present disclosure, the controller 120 determines the fuel demand of the engine 102 based on the operational conditions of the engine 102. The controller 120 determines the engine fuel demand based on a desired power output of the engine 102. The controller 120 determines a mass flow rate of the fuel that the engine 102 requires to produce a desired power output. Further, the controller 120 determines a density of the fuel to be supplied to the engine 102. For example, the fuel density may be determined by the controller 120, by means of temperature or pressure measurements taken in the tank 104. It will be contemplated that based on the fuel density and the mass flow rate of fuel required by the engine 102, such as in units of mass pounds per hour (lbm/hr), the controller 120 may determine the volumetric engine fuel demand, such as in units of gallons per minute (GPM).

The controller 120 accordingly operates the primary pump 106 based on the determined volumetric engine fuel demand. For example, the controller 120 adjusts the speed of the primary pump 106 to adjust the discharge output of the primary pump 106. Therefore, for higher engine fuel demands, the primary pump 106 is run at a higher speed and for lower engine fuel demands, such as during low load and idle conditions, the primary pump 106 is run at a lower speed. As explained previously, the primary pump 106 has a predefined range of rated minimum and maximum operating speed and the controller 120 operates the primary pump 106 within the predefined range to adjust the discharge output of the primary pump 106 based on the engine fuel demands.

Further, the controller 120 also determines a volumetric efficiency of the primary pump 106, in addition to the engine fuel demand, in order to determine and/or adjust the operational speed of the primary pump 106. It may be understood by a person having ordinary skill in the art, that the volumetric efficiency of the primary pump 106 indicates how efficiently and with what flow rate, the primary pump 106 is capable of pumping the liquefied fuel from the tank 104. The volumetric efficiency of the primary pump 106 may also be based on an age of the primary pump 106. The age of the primary pump 106 may be predefined and/or dynamically monitored using conventional techniques, such as by monitoring a receiving pressure of the pumped fuel at the accumulator 116 by using a feedback mechanism.

Further, the controller 120 determines whether the engine fuel demand is greater than a threshold value V1. The threshold value V1 is determined based on the discharge output of the primary pump 106. In an embodiment, the threshold value V1 is equal to the minimum rated discharge output of the primary pump 106. Therefore, the controller 120 determines whether the engine fuel demand is greater than the minimum discharge output of the primary pump 106. When the engine fuel demand is greater than the minimum discharge output of the primary pump 106, the controller 120 operates the fuel system 100 in a first operational mode. However, when the engine fuel demand is less than the threshold value V1, i.e., the minimum discharge output of the primary pump 106, then the controller 120 is configured to operate the fuel system 100 in a second operational mode.

In the first operational mode, the controller 120 adjusts the operational speed of the primary pump 106 according to the fuel demand of the engine 102 based on the numerous operating conditions of the engine 102. For example, the operational speed of the primary pump 106 is adjusted such that the discharge output of the primary pump 106 meets the engine fuel demand. It will be appreciated, that for frequent pressure fluctuations and engine fuel demand fluctuations, the primary pump 106 may not be as frequently adjusted, but may be operated at an operational speed to substantially meet the fluctuating engine fuel demands. Further, some portion of the pumped fuel from the primary pump 106 which is in excess of the engine fuel demand is diverted to the accumulator 116 for storage.

Further, the controller 120 is configured to adjust the operational speed of the secondary pump 110 in response to the adjustment to the operational speed of the primary pump 106. The controller 120 adjusts the operational speed of the secondary pump 110 based on the required suction pressure of the primary pump 106 and the amount of liquefied fuel required to be circulated through the primary pump 106 for cooling and the engine fuel demand. Accordingly, the controller 120 also adjusts the back pressure valve 112 in order to regulate the flow of the liquefied fuel through the primary pump 106 and back into the tank 104. In an embodiment, the back pressure valve 112 may be adjusted such that it facilitates flow of liquefied fuel equal to 0.1 times the total discharge output of the primary pump 106, through the primary pump 106. It may be well appreciated by a person having ordinary skill in the art, that apart from the desired suction pressure of the primary pump 106 and the amount of fuel to be circulated through the primary pump 106, other factors, such as performance and efficiency of the secondary pump 110, the design of the primary pump 106, etc., may also be considered in order to adjust the operational speed of the secondary pump 110.

Furthermore, when the determined engine fuel demand is less than the first threshold value V1, i.e., the minimum discharge output of the primary pump 106, then the controller 120 operates the fuel system 100 in the second operational mode. For example, when the engine 102 is in idle state (high or low idling conditions) or when the engine 102 operates at very low load conditions, which require fuel less than the minimum amount of fuel that the primary pump 106 is capable of pumping, then the controller 120 is configured to operate the fuel system 100 in the second operational mode.

In the second operational mode, the controller 120 operates the primary pump 106 at a minimum rated speed in order to pump a minimum amount of fuel. In an embodiment, a first portion of the pumped fuel from the primary pump 106 is provided to the engine 102, in order to meet the engine fuel demand. Further, the remaining portion of the pumped fuel, in excess to the engine fuel demand, is diverted to the accumulator 116 through the conduit 118. In various other embodiments, an additional portion of fuel may also be supplied for circulation through the primary pump 106. For example, if the discharge output of the primary pump 106 is 2 gallons per minute and the engine fuel demand is 0.5 gallons per minute, then, out of the 2 gallons of fuel pumped from the primary pump 106, 0.5 gallons (the first portion) is supplied to the engine 102 and the remaining 1.5 gallons is diverted to the accumulator 116 for storing.

In an embodiment, the controller 120 is further configured to monitor a pressure within the accumulator 116. For example, the controller 120 may communicate with a pressure sensor (not shown in FIG. 1) associated with the accumulator 116 to monitor the pressure within the accumulator 116. It may be appreciated that with the running primary pump 106, the accumulator 116 receives a portion of fuel that is pumped by the primary pump 106 via the vaporizer 114, thereby resulting in an increase in pressure therein. Since, the pumped fuel is stored in gaseous form within the accumulator 116, a significant amount of fuel can be compressed for storage within the accumulator 116. Therefore, the pressure within the accumulator 116 continuously increases until it reaches a first predefined pressure limit P1. When the monitored pressure within the accumulator 116 reaches the first predefined pressure limit P1, the controller 120 stops the supply of fuel from the primary pump 106 to the engine 102 and the accumulator 116. In an exemplary embodiment, the first predefined pressure limit P1 may be set based on the pressure capacity of the accumulator 116, thereby defining the maximum accumulation capacity of the accumulator 116 for storing of the high pressure gaseous fuel.

In an embodiment, when the pressure within the accumulator 116 reaches the first predefined pressure limit P1, the controller 120 checks whether the primary pump 106 can be switched off in order to stop supply of the pumped fuel from the primary pump 106 to the engine 102 as well as the accumulator 116. It may be contemplated that the primary pump 106 can be switched off and switched on a limited number of times within a specific time frame. Temperature limitations of the electric motor driving the primary pump 106 may restrict the number of times that the primary pump 106 can be switched off and switched on within a specific time frame, since an in-rush current associated with switching on may cause temperature related failures in the motor windings. For example, the primary pump 106 may only be switched on for a specified frequency f, such as for 4 times in an hour time frame, i.e., once in 15 minutes. It may be contemplated, that the number of times that the primary pump 106 may be switched on and switched off is merely exemplary and may vary for different pumps used as the primary pump 106.

Therefore, in order to determine whether the primary pump 106 can be switched off to stop the fuel supply from the primary pump 106 to the engine 102 and the accumulator 116, the controller 120 determines a time elapsed since the primary pump 106 was last switched off. When the determined time elapsed is greater than a predefined threshold time limit T, the controller 120 switches off the primary pump 106 to stop the fuel supply from the primary pump 106 to the engine 102 and the accumulator 116. When the determined time elapsed is less than the predefined threshold time limit T, the controller 120 indicates the unloader valve 108 to open instead of switching off the primary pump 106. Therefore, the pumped fuel from the primary pump 106 is directed back to the tank 104, thereby stopping the fuel flow from the primary pump 106 to the accumulator 116 and the engine 102. In an exemplary embodiment, the value of the predefined threshold time limit T is inversely proportional to the specified frequency f for which the primary pump 106 may be switched on and off. For example, the predefined threshold time limit T may be 15 minutes and the controller 120 switches off the primary pump 106, when the primary pump 106 was last switched off more than 15 minutes ago, else opens the unloader valve 108 when the primary pump 106 was last switched off less than 15 minutes ago.

In an embodiment, the controller 120 facilitates the accumulator 116 to supply fuel to the engine 102 in order to meet the engine fuel demand, when the direct supply of fuel from the primary pump 106 to the engine 102 and the accumulator 116 is stopped. For example, the fuel supply from the primary pump 106 in the conduit 118 is stopped and the engine 102 receives fuel stored in the accumulator 116 through the conduit 118 to meet the engine fuel demands. In an embodiment, the flow of fuel from the accumulator 116 to the engine 102 may be regulated according to the engine fuel demand.

Furthermore, the controller 120 is configured to restart the flow of fuel from the primary pump 106 to the accumulator 116 when the pressure within the accumulator 116 reaches a second predefined pressure limit P2. The second predefined pressure limit P2 is less than the first predefined pressure limit P1. For example, since the accumulator 116 supplies fuel to the engine 102 when the fuel supply to the engine 102 is stopped from the primary pump 106, the pressure within the accumulator 116 drops down. Therefore, the controller 120 detects that the pressure within the accumulator 116 has dropped down to reach the second predefined pressure limit P2, and accordingly restarts the fuel flow to the accumulator 116 from the primary pump 106.

In an embodiment, the second predefined pressure limit P2 is defined based on the desired output from the accumulator 116 to the engine 102. In one example, the second predefined pressure limit P2 is defined such that the accumulator 116 can provide fuel to the engine 102 at low load and idle operating conditions of the engine 102. The second predefined pressure limit P2 is set to 40 mega pascals (MPa) because, at this pressure, the accumulator 116 can supply fuel to the engine 102 during both the low load conditions as well as idle operating conditions. In another example, the second predefined pressure limit P2 is defined such that the accumulator 116 can provide fuel to the engine 102 at idle operating conditions only. Therefore, in this case, the second predefined pressure limit P2 is set to 25 MPa such that the accumulator 116 may supply fuel to the engine 102 during idle operating conditions.

In order to restart the fuel supply from the primary pump 106 to the engine 102 and the accumulator 116, the controller 120 switches on the primary pump 106 if the primary pump 106 was switched off, else, closes the unloader valve 108 if the primary pump 106 was running with the unloader valve 108 open. In an embodiment, the unloader valve 108, the secondary pump 110 and the back pressure valve 112 may be collectively operated by the controller 120 in order to start the primary pump 106 for restarting the fuel supply to the engine 102. For example, the secondary pump 110 is operated at its minimum rated speed and the back pressure valve 112 is accordingly adjusted such that a minimum amount of liquefied fuel is circulated through the primary pump 106 when it is switched off. As soon as the pressure within the accumulator 116 reaches the second predefined pressure limit P2, the controller 120 switches on the primary pump 106 and opens the unloader valve 108. Operational speed of the secondary pump 110 is also gradually increased according to the gradually increasing operational speed of the primary pump 106 when the primary pump 106 is starting up. Furthermore, when the primary pump 106 reaches the desired operational speed, the unloader valve 108 is closed at least partially, for normal operations of the primary pump 106, such that the primary pump 106 operates normally to pump fuel to be supplied to the engine 102 and the accumulator 116 based on the engine fuel demand.

INDUSTRIAL APPLICABILITY

Figure 2A:
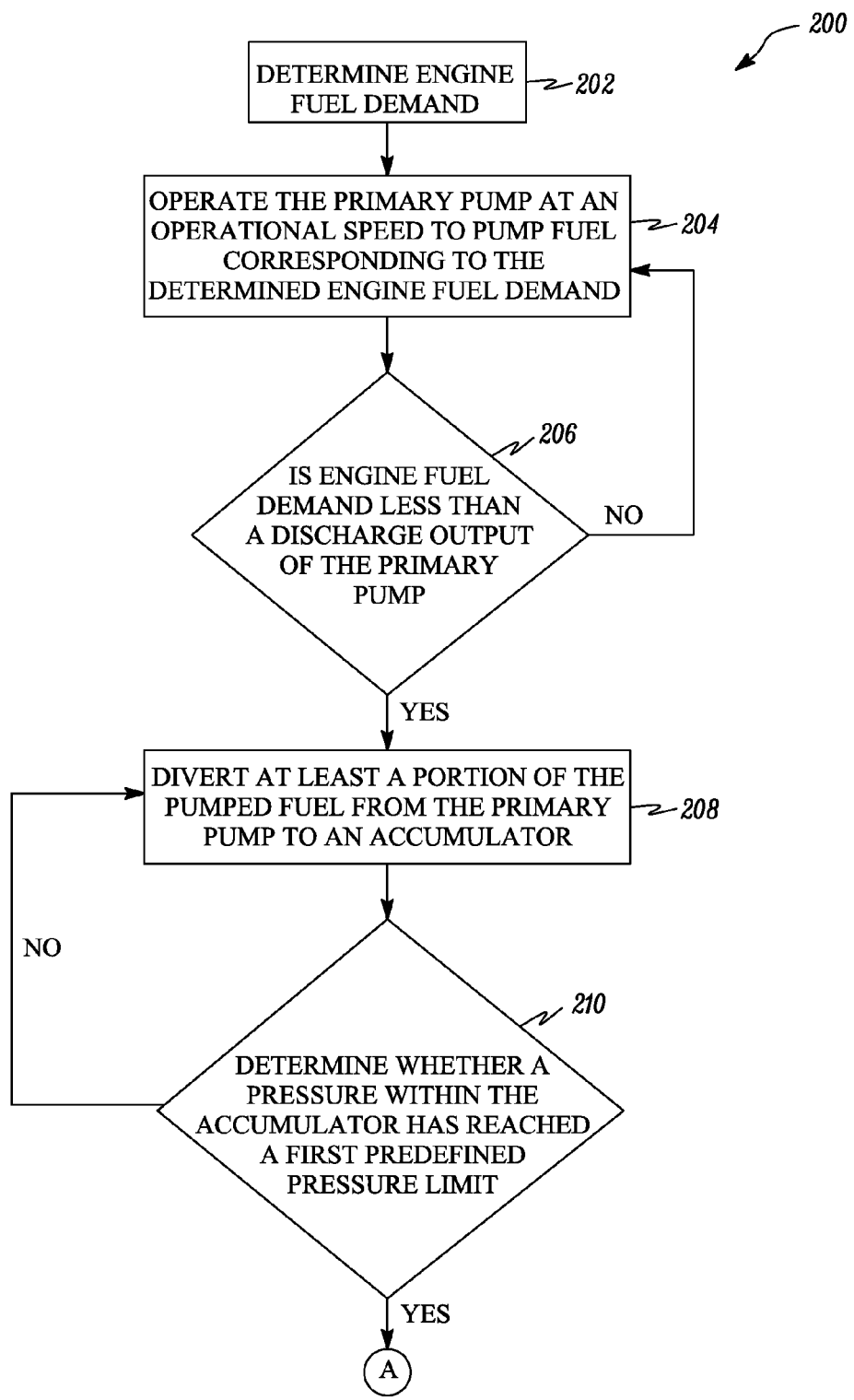
FIGS. 2A and 2B illustrate an exemplary method of operating the cryogenic fuel system, in accordance with embodiments of the present disclosure.
Figure 2B:
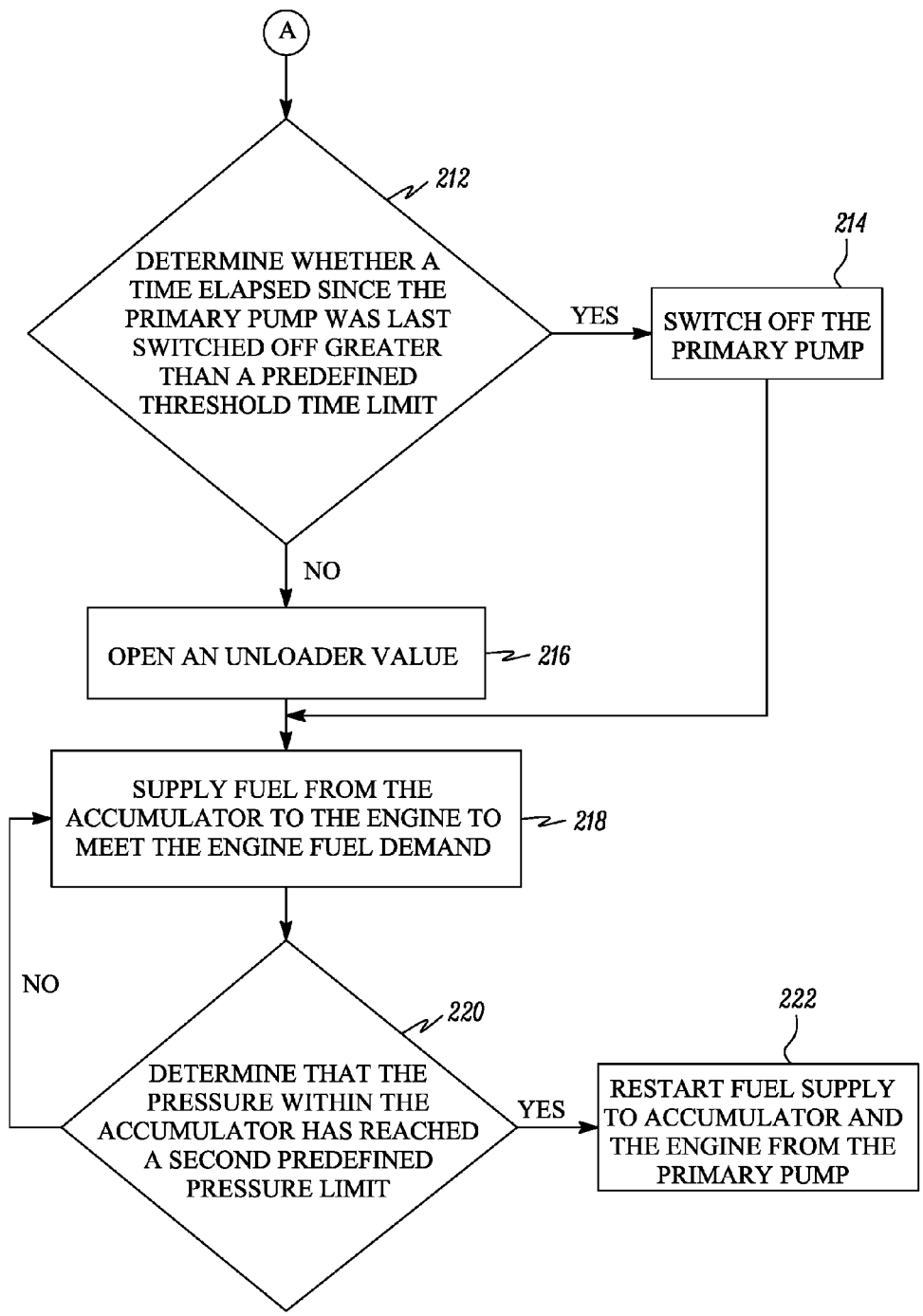

FIG. 2 illustrates an exemplary method 200 for operating the cryogenic fuel system 100. In an embodiment, the controller 120 performs the method 200 for operating the fuel system 100.

At step 202, an engine fuel demand is determined. The engine fuel demand is determined based on a desired power output of the engine 102. The engine fuel demand is determined based on a mass flow rate of fuel required by the engine 102 to produce a desired power output and density of the fuel supplied to the engine 102.

At step 204, the primary pump 106 is operated at an operational speed to pump fuel corresponding to the engine fuel demand. For example, the operational speed of the primary pump 106 is adjusted based on the engine fuel demand to adjust the discharge output of the primary pump 106 accordingly. The primary pump 106 is operated within a predefined range of rated minimum and maximum operating speeds to adjust the discharge output of the primary pump 106 based on the engine fuel demands. In an embodiment, the operational speed of the primary pump 106 is further adjusted based on a volumetric efficiency of the primary pump 106. The volumetric efficiency of the primary pump 106 indicates how efficiently and with what pressure, the primary pump 106 is capable of delivering the liquefied fuel from the tank 104.

At step 206, it is determined whether the engine fuel demand is less than a discharge output of the primary pump 106. In an embodiment, in low load and/or idle load conditions, it is determined whether the engine fuel demand is less than the minimum discharge output of the primary pump 106.

If at step 206, it is determined that the engine fuel demand is not less than the minimum discharge output of the primary pump 106, i.e., the 'No' branch, then the control moves back to step 206 to operate the primary pump 106 to pump fuel from the tank 104 to be supplied to the engine 102 to meet the engine fuel demands. Therefore, the corresponding amount of fuel is supplied to the engine 102 from the primary pump 106 via the vaporizer 114. In an embodiment of the present disclosure, the operational speed of the secondary pump (the boost pump) 110 is also adjusted in accordance with the operational speed of the primary pump 106. For example, the secondary pump 110 is operated to provide fuel from the tank 104 to the primary pump 106 at a required suction pressure at an inlet of the primary pump 106. Furthermore, the secondary pump 110 is operated to continuously circulate liquefied fuel from the tank 104 through the primary pump 106 for cooling the primary pump 106 during operation. In an embodiment, the amount of liquefied fuel to be circulated through the primary pump 106 is directly proportional to the discharge output of the primary pump 106.

Further, if at step 206, it is determined that the engine fuel demand is less than the minimum discharge output of the primary pump 106, i.e., the 'Yes' branch, then the control moves to step 208. At step 208, at least a portion of the pumped fuel from the primary pump 106 is diverted to the accumulator 116. For example, the primary pump 106 is operated at a minimum rated speed in order to pump a minimum amount of fuel. A first portion of the pumped fuel from the primary pump 106 is provided to the engine 102, in order to meet the engine fuel demand, and the remaining portion of the pumped fuel, in excess to the engine fuel demand, is diverted to the accumulator 116.

At step 210, a pressure within the accumulator 116 is monitored and it is determined whether the pressure within the accumulator 116 has reached a predefined pressure limit P1. In an exemplary embodiment, the first predefined pressure limit P1 may be set based on the pressure capacity of the accumulator 116, thereby defining the accumulation capacity of the accumulator 116 for storing high pressure gaseous fuel. When the monitored pressure within the accumulator 116 has not reached the first predefined pressure limit P1, i.e., the 'No' branch, then the accumulator 116 continues to get supplied with a portion of fuel pumped from the primary pump 106, and the control moves back to step 208.

Furthermore, if at step 210 it is determined that the monitored pressure within the accumulator 116 has reached the first predefined pressure limit P1, i.e., the 'Yes' branch, then the control moves to step 212. At step 212, it is determined whether a time elapsed since the primary pump 106 was last switched off, is greater than a predefined threshold time limit T. If the time elapsed since the primary pump 106 was last switched off is greater than the predefined threshold time limit T, i.e., the 'Yes' branch, then the primary pump 106 is switched off at step 214 to stop fuel supply from the primary pump 106 to the accumulator 116 and the engine 102.

However, if at step 212, it is determined that the time elapsed since the primary pump 106 was last switched off is less than the predefined threshold time limit T, i.e., the 'No' branch, then the control moves to step 216. At step 216, the unloader valve 108 is opened to divert the pumped fuel from the primary pump 106 back into the tank 104, thereby stopping the fuel supply from the primary pump 106 to the accumulator 116 and the engine 102. Therefore, the primary pump 106 is not stopped, but continues to operate at the minimum rated operational speed. However, the pumped fuel does not reach the engine 102 and the accumulator 116, instead gets drained back into the tank 104.

It may be contemplated that the primary pump 106 can be switched off and switched on, for a limited number of times within a specific time frame. Winding temperature increased by in-rush current of the electric motor driving the primary pump 106 may restrict the number of times that the primary pump 106 can be switched off and switched on within a specific time frame. For example, the primary pump 106 may only be switched on for four times in an hour time frame, i.e., once in 15 minutes. It may be contemplated, that the number of times that the primary pump 106 may be switched on and switched off is merely exemplary, and may vary for different pumps used as the primary pump 106. Therefore, in order to stop fuel supply to the accumulator 116 and the engine 102 from the primary pump 106, it is necessary to determine whether the primary pump 106 can be switched off or it needs to run with the unloader valve 108.

Further, when the fuel supply to the accumulator 116 and the engine 102 from the primary pump 106 is stopped by either switching off the primary pump 106 at step 214 or opening the unloader valve 108 at step 216, the control moves to step 218. At step 218, fuel is supplied from the accumulator 116 to the engine 102 to meet the engine fuel demands. In an embodiment, the accumulator 116 may provide the fuel to meet the engine fuel demands at low load and idle operating conditions of the engine 102.

At step 220, it is determined that the pressure within the accumulator 116 has reached a second predefined pressure limit P2. The second predefined pressure limit P2 is less than the first predefined pressure limit P1. For example, since the accumulator 116 supplies fuel to the engine 102 when the fuel supply to the engine 102 from the primary pump 106 is stopped, the pressure within the accumulator 116 drops down.

If at step 220, it is determined that the pressure within the accumulator 116 has not reached the second predefined pressure limit P2, i.e., the 'No' branch, then the control moves back to step 218 to supply fuel to the engine 102 from the accumulator 116.

Whereas, if at step 220 it is determined that the pressure within the accumulator 116 has reached the second predefined pressure limit P2, i.e., the 'Yes' branch, then the control moves step 222. At step 222, the fuel supply to the accumulator 116 is restarted from the primary pump 106. In an embodiment, in order to restart fuel supply to the accumulator 116, the primary pump 106 is either switched on if it was switched off or the unloader valve 108 is closed.

In an embodiment, the secondary pump 110 is run at its minimum rated speed and the back pressure valve 112 is accordingly adjusted such that a minimum amount of cryogenic fuel is circulated around the primary pump 106 when it is switched off. As soon as the pressure within the accumulator 116 reaches the second predefined pressure limit P2, the primary pump 106 is switched on with the unloader valve 108 open, in order to start the primary pump 106. Operational speed of the secondary pump 110 is gradually increased according to the gradually increasing operational speed of the primary pump 106 when the primary pump 106 is starting up. Furthermore, when the primary pump 106 reaches the desired operational speed, the unloader valve 108 is closed for normal operations of the primary pump 106, such that the primary pump 106 operates normally to pump fuel to be supplied to the engine 102 and the accumulator 116 based on the engine fuel demand.

The cryogenic fuel system 100 as disclosed herein finds industrial applicability in Natural Gas (NG) and other cryogenic liquid fuel powered vehicles. Operating the fuel system 100 according to the various embodiments of present disclosure results in efficient fuel usage during low load and idle operating conditions of the engine 102, where the engine fuel demand is much lesser than the minimum discharge output possible from the cryogenic fuel pump or the primary pump 106. Since the primary pump 106 cannot be operated at lesser speed than its rated minimum speed, the amount of fuel pumped from the primary pump 106 at its minimum rated speed which is in excess of the required engine fuel demand, is diverted and stored in the accumulator 116. Furthermore, the stored fuel in the accumulator 116 can be utilized to later supply fuel to the engine 102 in order to meet the engine fuel demand when the supply of fuel to the engine 102 from the primary pump 106 is stopped. This means that the primary pump 106 can be switched off without affecting the fuel supply to the engine 102. This allows efficient utilization of the fuel pumped from the primary pump 106 without excessive fuel wastage and unnecessary power consumption by the primary pump 106.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method of operating a cryogenic fuel system for supplying fuel to an engine, the method comprising:
   operating a cryogenic fuel pump, to pump fuel to be supplied to the engine;
   diverting, at least a portion of the pumped fuel, to an accumulator when a fuel demand of the engine is less than a discharge output of the cryogenic fuel pump;
   stopping supply of the pumped fuel from the cryogenic fuel pump to the engine and the accumulator, when a pressure within the accumulator reaches a first predefined pressure limit; and
   supplying fuel to the engine from the accumulator, when supply of the pumped fuel from the cryogenic fuel pump to the engine and the accumulator is stopped,
   wherein the stopping of the supply of the pumped fuel from the cryogenic fuel pump to the engine and the accumulator further comprising switching off the cryogenic fuel pump when a time elapsed, since the cryogenic fuel pump was last switched off, is greater than a predefined threshold time limit.

2. The method as claimed in claim 1, wherein operating the cryogenic fuel pump further comprising operating the cryogenic fuel pump at a minimum operational speed to pump minimum amount of fuel, when the fuel demand of the engine is less than a minimum discharge output of the cryogenic fuel pump.

3. The method as claimed in claim 1 further comprising providing a first portion of the pumped fuel to be supplied to the engine in order to meet fuel demand of the engine, when the fuel demand of the engine is less than the discharge output of the cryogenic fuel pump.

4. The method as claimed in claim 1 further comprising converting the pumped fuel from a liquefied state into a gaseous state before supplying to the accumulator and the engine.

5. The method as claimed in claim 1 further comprising operating a secondary pump for pressurizing fuel flow from a cryogenic fuel tank to an inlet of the cryogenic fuel pump and circulating the fuel around the cryogenic fuel pump.

6. The method as claimed in claim 1, wherein stopping supply of the pumped fuel from the cryogenic fuel pump to the engine and the accumulator further comprising operating the cryogenic fuel pump at a minimum rated operational speed with an open unloader valve when a time elapsed, since the cryogenic fuel pump was last switched off, is less than a predefine threshold time limit.

7. The method as claimed in claim 6 further comprising draining the pumped fuel from the cryogenic fuel pump back into a cryogenic fuel tank.

8. The method as claimed in claim 1 further comprising restarting fuel supply from the cryogenic fuel pump to the accumulator and the engine when the pressure within the accumulator reaches a second predefined pressure limit, wherein the second predefined pressure limit is lower than the first predefined pressure limit.

9. A control system for operating a cryogenic fuel system for supplying fuel to an engine, the control system comprising:
   a controller operatively coupled to the engine, a cryogenic fuel pump, and an accumulator of the cryogenic fuel system, the controller being configured to:
   operate the cryogenic fuel pump, to pump fuel to be supplied to the engine;
   divert at least a portion of the pumped fuel to the accumulator when a fuel demand of the engine is less than a discharge output of the cryogenic fuel pump;
   stop supply of the pumped fuel from the cryogenic fuel pump to the engine and the accumulator, when a pressure within the accumulator reaches a first predefined pressure limit; and
   facilitate fuel supply from the accumulator to the engine, when supply of the pumped fuel from the cryogenic fuel pump to the engine and the accumulator is stopped,
   wherein the stop supply of the pumped fuel from the cryogenic fuel pump to the engine and the accumulator is by switching off the cryogenic fuel pump when a time elapsed, since the cryogenic fuel pump was last switched off, is greater than a predefined threshold time limit.

10. The control system as claimed in claim 9, wherein the controller is further configured to operate the cryogenic fuel pump at a minimum rated speed when the fuel demand of the engine is less than a minimum discharge output of the cryogenic fuel pump.

11. The control system as claimed in claim 9, wherein the controller is configured to stop supply of the pumped fuel from the cryogenic fuel pump to the engine and the accumulator by operating the cryogenic fuel pump at a minimum rated operational speed with an open unloader valve, when a time elapsed, since the cryogenic fuel pump was last switched off, is less than a predefined threshold time limit.

12. The control system as claimed in claim 9, wherein the controller is further configured to restart the fuel supply from the cryogenic fuel pump to the accumulator and the engine, when the pressure within the accumulator reaches a second predefined pressure limit, and wherein the second predefined pressure limit is lower than the first predefined pressure limit.

13. A cryogenic fuel system for supplying fuel to an engine, the cryogenic fuel system comprising:
   a cryogenic fuel tank configured to store cryogenic fuel;
   a cryogenic fuel pump configured to pump fuel from the cryogenic fuel tank to be supplied to the engine;
   an accumulator, fluidly coupled to the cryogenic fuel pump and the engine; and
   a controller operatively coupled to the cryogenic fuel pump, the accumulator and the engine, the controller being configured to:
   divert at least a portion of the pumped fuel to the accumulator, when a fuel demand of the engine is less than a discharge output of the cryogenic fuel pump;

stop supply of the pumped fuel from the cryogenic fuel pump to the engine and the accumulator, when a pressure within the accumulator reaches a first predefined pressure limit, wherein the stop supply of the pumped fuel from the cryogenic fuel pump to the engine and the accumulator is by switching off the cryogenic fuel pump, when a time elapsed, since the cryogenic fuel pump was last switched off, is greater than a predefine threshold time limit; and facilitate fuel supply from the accumulator to the engine, when supply of the pumped fuel from the cryogenic fuel pump to the engine and the accumulator is stopped.

14. The cryogenic fuel system as claimed in claim 13 further comprising a vaporizer fluidly connected to the cryogenic fuel pump, the vaporizer being configured to convert the pumped fuel from a liquefied state into a gaseous state before supplying the fuel to the engine and the accumulator.

15. The cryogenic fuel system as claimed in claim 13 further comprising a boost pump configured to pressurize fuel flow to the cryogenic fuel pump and circulate the fuel around the cryogenic fuel pump.

16. The cryogenic fuel system as claimed in claim 13 further comprising a back pressure valve fluidly connected to an outlet of the cryogenic fuel pump and configured to facilitate circulation of the fuel from the cryogenic fuel tank around the cryogenic fuel pump.

17. The cryogenic fuel system as claimed in claim 13 further comprising an unloader valve fluidly connected to an outlet of the cryogenic fuel pump and configured to drain the pumped fuel from the cryogenic fuel pump to the cryogenic fuel tank.

18. The cryogenic fuel system as claimed in claim 13, wherein the controller is further configured to:

stop supply of the pumped fuel from the cryogenic fuel pump to the engine and the accumulator by operating the cryogenic fuel pump at a minimum rated operational speed with an open unloader valve when a time elapsed, since the cryogenic fuel pump was last switched off, is less than a predefine threshold time limit.

* * * * *